United States Patent
Annamalai et al.

(10) Patent No.: US 12,321,908 B2
(45) Date of Patent: *Jun. 3, 2025

(54) SYSTEMS AND METHODS FOR CREATING DYNAMIC SESSIONS FOR MOBILE APPLICATION INTEGRATION

(71) Applicant: PayPal, Inc., San Jose, CA (US)

(72) Inventors: Prasanna Annamalai, Chennai (IN); Harish Annam, Nanganallur (IN); Arun Arumugam, Puducherry (IN); Madar Areef Hussain Shaik, Chennai (IN)

(73) Assignee: PAYPAL, INC., San Jose, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/565,073

(22) Filed: Dec. 29, 2021

(65) Prior Publication Data

US 2022/0122049 A1    Apr. 21, 2022

Related U.S. Application Data

(63) Continuation of application No. 16/731,535, filed on Dec. 31, 2019, now Pat. No. 11,276,049.

(51) Int. Cl.
*G06Q 20/10* (2012.01)
*G06Q 20/32* (2012.01)
(Continued)

(52) U.S. Cl.
CPC ....... *G06Q 20/108* (2013.01); *G06Q 20/3223* (2013.01); *G06Q 20/385* (2013.01);
(Continued)

(58) Field of Classification Search
CPC ............. G06Q 20/108; G06Q 20/3223; G06Q 20/385; G06Q 20/401; G06Q 20/42; H04L 63/0807; H04L 67/146; G06F 16/2379
See application file for complete search history.

(56) References Cited

U.S. PATENT DOCUMENTS

| | | |
|---|---|---|
| 8,874,899 B1 | 10/2014 | Persson et al. |
| 8,943,150 B2 | 1/2015 | Massey et al. |

(Continued)

FOREIGN PATENT DOCUMENTS

| | | | | |
|---|---|---|---|---|
| EP | 3198397 B1 | * 10/2021 | ........... | G06F 21/445 |
| WO | WO-2010033967 A1 | * 3/2010 | ............. | G06Q 20/10 |

(Continued)

OTHER PUBLICATIONS

Dacosta et al.: One-Time Cookie: Preventing Session Hijacking Attacks with Stateless Authentication Tokens, Jun. 2012, ACM Transactions on Internet Technology, vol. 12, No. 1, Article 1, pp. 1.1-1.24 (Year: 2012).*

(Continued)

*Primary Examiner* — Bijendra K Shrestha

(74) *Attorney, Agent, or Firm* — Haynes and Boone, LLP

(57) ABSTRACT

Systems and methods for mobile application integration are described. These may include receiving a payment request a mobile application, sending a payment application detection request, receiving a detection response, and sending a customized user interface to the mobile device. The customized user interfaces are determined by whether an associated payment application is present on the mobile device and whether the mobile device is authenticated with the payment processing platform. These techniques can allow for a better user experience when interacting with the payment processing platform.

20 Claims, 8 Drawing Sheets

(51) Int. Cl.
 *G06Q 20/38* (2012.01)
 *G06Q 20/40* (2012.01)
 *G06Q 20/42* (2012.01)
 *H04L 9/40* (2022.01)
 *H04L 67/146* (2022.01)
 *G06F 16/23* (2019.01)

(52) U.S. Cl.
 CPC ........... *G06Q 20/401* (2013.01); *G06Q 20/42* (2013.01); *H04L 63/0807* (2013.01); *H04L 67/146* (2013.01); *G06F 16/2379* (2019.01)

(56) References Cited

U.S. PATENT DOCUMENTS

| | | | | |
|---|---|---|---|---|
| 10,430,796 | B2 * | 10/2019 | Shah | G06Q 20/4014 |
| 10,467,615 | B1 * | 11/2019 | Omojola | G06Q 30/0637 |
| 10,885,541 | B1 | 1/2021 | Ho | |
| 2012/0324556 | A1 * | 12/2012 | Yefimov | H04W 4/00 726/7 |
| 2015/0178726 | A1 * | 6/2015 | Wen | G06Q 20/40 705/44 |
| 2016/0314460 | A1 * | 10/2016 | Subramanian | G06Q 20/12 |
| 2017/0316400 | A1 * | 11/2017 | Venkatakrishnan | G06Q 20/3223 |
| 2018/0137505 | A1 * | 5/2018 | Soppitt | G06Q 20/40 |
| 2018/0314513 | A1 | 11/2018 | DiTullio et al. | |
| 2020/0028753 | A1 * | 1/2020 | Powar | H04W 4/08 |
| 2020/0082459 | A1 * | 3/2020 | Varma | G06Q 20/102 |

FOREIGN PATENT DOCUMENTS

| | | | | |
|---|---|---|---|---|
| WO | 2016015096 | A1 | 2/2016 | |
| WO | WO-2016175896 | A1 * | 11/2016 | G06F 21/335 |
| WO | WO-2017189917 | A1 * | 11/2017 | G06Q 20/12 |

OTHER PUBLICATIONS

Popa, Raluca, Ada: Web Security: Session Management and CSRF, Feb. 10, 2017, CS 161: Computer Security, pp. 1-52 (Year: 2017).*

Polat et al.: Token-based authentication for M2M Platforms, 2016, Turkish Journal of Electrical Engineering and Computer Science, pp. 1-12 (Year: 2016).*

Klm, Albert: Understanding User Authentication in Your Web App and How to Implement it Part 1 (the High Level Overview), Apr. 26, 2019, Medium, pp. 1-40 (Year: 2019).*

Cipriani J., "How to Check Your Android Phone Malicious Apps," May 14, 2019, 4 pages.

Polat H., et al., "Token-Based Authentication for M2M Platforms," Turkish Journal of Electrical Engineering and Computer Sciences, vol. 25, Jul. 30, 2017, 12 pages.

* cited by examiner

SYSTEMS AND METHODS FOR CREATING DYNAMIC SESSIONS FOR MOBILE APPLICATION INTEGRATION

CROSS REFERENCE TO RELATED APPLICATIONS

The present application is a continuation application of U.S. patent application Ser. No. 16/731,535, filed Dec. 31, 2019, and is incorporated in reference in its entirety.

FIELD OF INVENTION

The present specification generally relates to mobile application integration, specifically to integrating session information and dynamic user interfaces in mobile applications, according to various embodiments of the disclosure.

BACKGROUND

Applicant recognizes that in mobile applications, the user experience for checkout is traditionally dependent on the developer of the mobile application, especially with regards to interfacing with payment processing platforms. Mobile applications often use browser objects to display the interface of a payment processing platform. However, this creates an inconvenient user experience, as the browser session is tied to the underlying mobile application and is not authenticated with the payment processing platform. The user would need to authenticate with the payment processing platform, even if the user is already authenticated to the payment processing platform in other mobile applications, such as a mobile application developed by the payment processor. Alternatively, the mobile application can pass the requested transaction to the payment processor's mobile application to complete the transaction. However, this forces the user to download and install a second mobile application. Thus, within the mobile application's browser window, there is a need to dynamically display a payment interface that provides the greatest convenience to the user based on what other mobile applications are installed and what services the user has been authenticated with.

Figure 1:
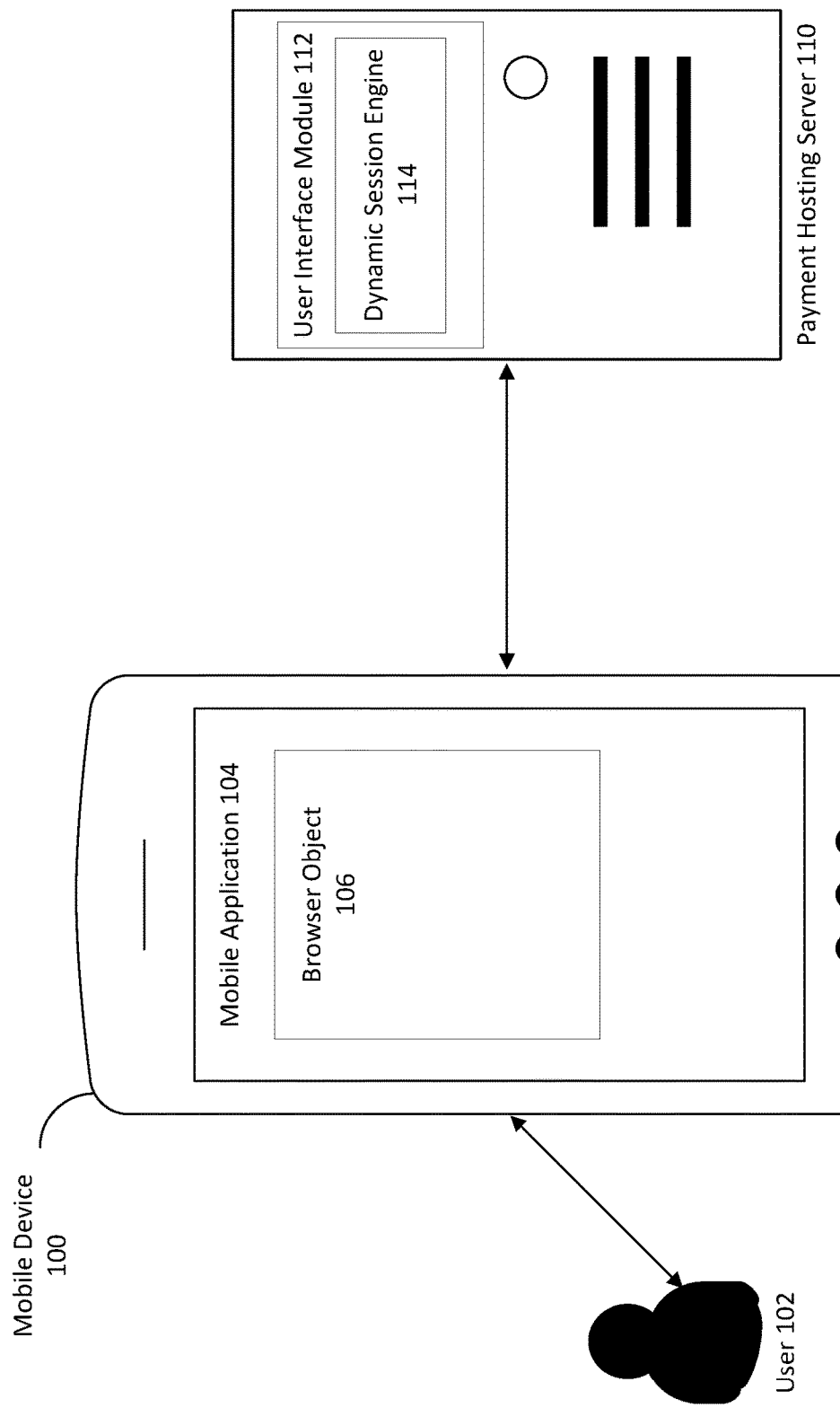
FIG. 1 is an illustration showing a mobile device running a mobile application containing a browser object according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for dynamically integrating mobile applications, according to various embodiments. Mobile applications, such as shopping applications, often process payments from users purchasing products or services. Payment processors, such as PayPal, provide interfaces that developers of mobile applications can use to integrate the payment hosting server into the mobile application. This is traditionally implemented using a browser object within the mobile application. These browser objects are usually not fully-developed browsers, but webview interfaces, such as Android WebView or iOS WKWebView, that allow the display of web content in non-browser applications. According to various embodiments of the disclosure, a dynamic session engine can display a different interface in the browser object based on whether the user has the payment processor's mobile application (payment application) installed on the device and whether the user has already authenticated with the payment application. For example, if the user does not have the payment application installed on the mobile device, the system may display an interface for the user to enter payment information, such as credit card information, for one-time use. The system may also display an option for the user to login to the payment hosting server. In some embodiments, if the user does have the payment application installed on the mobile device and the user is authenticated with the payment application, the system may use the credentials of the payment application to authenticate with the payment hosting server, and the system may display an interface for the user indicating they are authenticated with the system and allow the user to complete the payment transaction without further authentication. An authentication cookie (e.g. a cookie) may be stored in a data store associated with the browser object. In some embodiments, the authentication cookie may be authenticated session information stored in a mobile device data store 214 associated with the mobile device.

FIG. 1 illustrates a mobile device 100, within which a mobile application 104 may implement a browser object 106 used to interface with a payment processor to complete a payment transaction, according to some embodiments of the disclosure. For example, a user 102 may use the mobile device 100 to open a shopping mobile application 104 to make a purchase. The user 102 may select a payment hosting server causing the mobile application 104 to open a browser object 106 to contact the payment hosting server 110 to complete the payment transaction. The payment hosting server 110 may contain a dynamic session engine 114 that will cause the browser object 106 to display a dynamic user interface based on whether the mobile device 100 has a payment application installed and whether the user 102 is authenticated with the payment application, as further described in FIG. 2 below.

Figure 2:
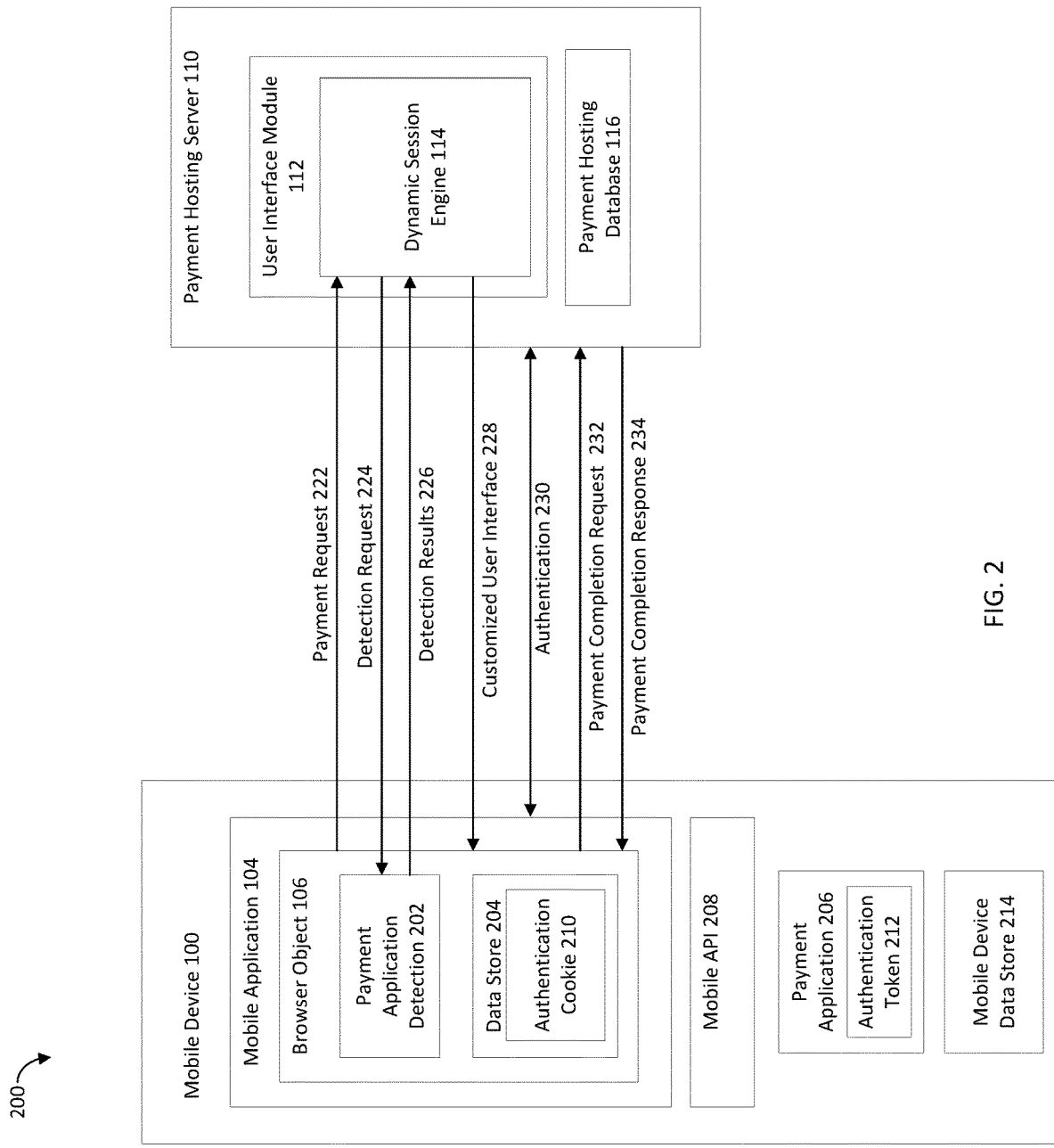
FIG. 2 is a block diagram showing the interaction between the mobile device and the dynamic session engine according to an embodiment of the present disclosure.

FIG. 2 illustrates a block diagram 200 showing the interaction between the mobile device 100 and the payment hosting server 110 according to some embodiments of the disclosure. The mobile device 100 runs a mobile application 104. Within the mobile application 104, a user 102 can perform a user input, such as selecting a link, to perform a payment within the mobile application 104. The mobile application 104 opens and displays a browser object 106, such as a webview, in response to the user input. The browser object 106 executes code to send a payment request 222 to the payment hosting server 110. The payment hosting server 110 directs the request to a user interface module 112 containing dynamic session engine 114 to determine the content for the customized user interface 228. The dynamic session engine 114 sends a detection request 224 that will cause the browser object 106 to perform payment application detection 202. During payment application detection 202, the browser object 106 will execute logic allowing the browser object to use the application programming interface (API) 208 of the mobile device 100, as described below, to determine whether the payment application 206 is present on the mobile device and whether the user has previously authenticated with the payment hosting server 110 using the payment application 206. The results of payment application detection 202 will be transmitted as detection results 226 back to the dynamic session engine 114. The dynamic session engine 114 will then determine the content for the customized user interface 228 which will then be sent to the browser object 106 for display to the user.

In some embodiments, the payment application 206 is not present on the mobile device 100. The determination that the payment application 206 is not present is transmitted back to the dynamic session engine 114 as detection results 226. The dynamic session engine 114 may create a customized user interface 228 to have content to allow the user 102 to enter data needed to make a one-time payment. The customized user interface 228 is then transmitted back to the browser object 106 for display to the user 102. The user 102 may then input data into the browser object 106 for to complete a one-time payment. This information is used to create a payment completion request 232 containing the information needed by the payment hosting server 110 to process the transaction. The payment completion request 232 may contain information such as credit card information, billing information, banking information, transaction amount, or other information needed to complete a one-time payment. The payment hosting server 110 then interacts with other transaction processing components, such as those in FIG. 3, described below, to complete processing of the transaction. Once the payment hosting server has completed the transaction, the payment hosting server 110 transmits a payment completion response 234 to the browser object 106 for display to the user 102. The payment completion response 234 may be a confirmation of the completed transaction, or an error message indicating that the transaction could not be completed. In some embodiments, no authentication 230 needs to occur to complete a one-time payment.

In other embodiments, the payment application 206 is present on the mobile device 100, and an authentication cookie 210 may be retrieved from a data store 204 of the browser object 106. The authentication cookie 210 may be transmitted to the payment hosting server 110 for authentication 230. The authentication cookie 210 may also be stored elsewhere on the mobile device 100, such as within the payment application 206, or a data store 204 used by the operating system of the mobile device 100. The detection request 224 may contain information from the payment hosting server 110 to allow the browser object 106 to access external data stores such as data stores within the payment application 206 or a mobile device data store 214 used by the mobile operating system. The payment hosting server 110 may use the authentication cookie 210 to associate the payment request 222 to an existing user account. The payment hosting server 110 may compare the data in the authentication cookie 210 to expected values in the payment hosting database 116. In some embodiments, the payment hosting server 110 may perform authentication by contacting other systems, such as those in FIG. 3, described below. The dynamic session engine 114 may create a customized user interface 228 to have content showing the user 102 is authenticated with the payment hosting server 110 and requesting user input to confirm the transaction. The customized user interface 228 may be further customized based on the authenticated user and any preferences or other settings associated with the user. The customized user interface 228 is then transmitted back to the browser object 106 for display to the user 102. The user 102 may then input data into the browser object 106 to confirm the payment. The user input may create a payment completion request 232 containing the information needed by the payment hosting server 110 to process the transaction. The payment completion request 232 may contain the transaction amount, payment method, or other information needed to confirm and complete the payment transaction. The payment hosting server 110 then interacts with other transaction processing components, such as those in FIG. 3, described below, to complete processing of the transaction. Once the payment hosting server 110 has completed the transaction, the payment hosting server 110 transmits a payment completion response 234 to the browser object 106 for display to the user 102. The payment completion response 234 may be a confirmation of the completed transaction, or an error message indicating that the transaction could not be completed.

In other embodiments, an authentication token 212 may be used to authenticate 230 with the payment hosting server 110 instead of an authentication cookie 210. The authentication token 212 may be retrieved from the payment application 206, or it may be retrieved from the mobile device data store 214. The payment application 206 may require the browser object 106 to transmit credentials to the payment application 206 indicating that the browser object 106 or mobile application 104 has permission to retrieve the authentication token 212. The payment hosting server 110 may provide the credentials needed to retrieve the authentication token 212 as part of the detection request 224. The payment hosting server 110 may use the authentication token 212 to associate the payment request 222 to an existing user account. The payment hosting server 110 may compare the data in the authentication token 212 to expected values in the payment hosting database 116. In some embodiments, the payment hosting server 110 may perform authentication by contacting other systems, such as those in FIG. 3, described below. The dynamic session engine 114 may create a customized user interface 228 to have content showing the user 102 is authenticated with the payment hosting server 110 and requesting user input to confirm the transaction. The customized user interface 228 may be further customized based on the authenticated user and any preferences or other settings associated with the user. The customized user interface 228 is then transmitted back to the browser object 106 for display to the user 102. The user 102 may then input data into the browser object 106 to confirm the payment. The user input may create a payment completion request 232 containing the information needed by the payment hosting server 110 to process the transaction. The payment completion request 232 may contain the transaction amount, payment method, or other information needed to confirm and complete the payment transaction. The payment hosting server 110 then interacts with other transaction processing components, such as those in FIG. 3, described below, to complete processing of the transaction. Once the payment hosting server 110 has completed the transaction, the payment hosting server 110 transmits a payment completion response 234 to the browser object 106 for display to the user 102. The payment completion response 234 may be a confirmation of the completed transaction, or an error message indicating that the transaction could not be completed. The payment hosting server 110 may create an authentication cookie 210 to indicate that the browser object 106 has authenticated with the payment hosting server 110. The authentication cookie 210 may be included the in the payment completion response 234 so that the browser object 106 can store the authentication cookie 210 in the data store 204 of the browser object. In some embodiments, the authentication cookie 210 is accessible only by the browser object 106 associated with the mobile application 104.

In other embodiments, the payment application 206 is present on the mobile device 100, and no authentication cookies 210 or authentication tokens 212 are present on the device. The dynamic session engine 114 may create a customized user interface 228 to have content showing the user 102 an interface to provide authentication credentials by user input. In some embodiments, the mobile application 104 may show an interface to request biometric authentication credentials from the user 102. The user input may comprise typed credentials or biometric credentials such as fingerprint, retinal scan, or other biometrics. In some embodiments, the browser object 106 may take the authentication credentials and transmit them to the payment hosting server 110 for authentication 230. In some embodiments, the mobile application 104 may take the authentication credentials and transmit them to the payment hosting server 110 for authentication 230. The payment hosting server 110 may compare the authentication credentials to expected values in the payment hosting database 116. In some embodiments, the payment hosting server 110 may perform authentication by contacting other systems, such as those in FIG. 3, described below. In some embodiments, the payment hosting server 110 verifies that the authentication credentials are valid and completes authentication 230 by sending content to be displayed in the browser object 106 indicating that the user is authenticated allowing the user 102 to confirm and complete the transaction. In some embodiments, an authentication cookie 210 may also be sent to the browser object 106 as part of completing authentication 230. The browser object 106 may store the authentication cookie 210 in the data store 204 associated with the browser object. In some embodiments, the authentication cookie 210 may also be stored elsewhere on the mobile device 100, such as within the payment application 206, or a mobile device data store 214 used by the operating system of the mobile device 100. The user 102 may then input data into the browser object 106 to confirm the payment. The user input may create a payment completion request 232 containing the information needed by the payment hosting server 110 to process the transaction. The payment completion request 232 may contain the transaction amount, payment method, or other information needed to confirm and complete the payment transaction. The payment hosting server 110 then interacts with other transaction processing components, such as those in FIG. 3, described below, to complete processing of the transaction. Once the payment hosting server has completed the transaction, the payment hosting server 110 transmits a payment completion response 234 to the browser object 106 for display to the user 102. The payment completion response 234 may be a confirmation of the completed transaction, or an error message indicating that the transaction could not be completed.

In some embodiments, the authentication 230 performed by transmitting the authentication cookie 210 or user provided authentication information may not be successful. A failure to authenticate may be caused by invalid or expired authentication token 212 or an invalid or expired authentication cookie. In some embodiments, the payment hosting server 110 may send an error indicating that authentication has failed during authentication 230. In some embodiments, the browser object 106 may discard the expired authentication cookie 210 and attempt to retrieve an authentication token 212 for use as authentication credentials from the payment application 206. In other embodiments, the payment hosting server 110 may also transmit a user interface to be displayed in the browser object 106 to allow user input of updated authentication credentials. The user input may comprise typed credentials or biometric credentials such as fingerprint, retinal scan, or other biometrics. The browser object 106 may take the authentication credentials and transmit them to the payment hosting server 110 for authentication 230. The payment hosting server 110 may compare the authentication credentials to expected values in the payment hosting database 116. In some embodiments, the payment hosting server 110 may perform authentication by contacting other systems, such as those in FIG. 3, described below. In some embodiments, the payment hosting server 110 verifies that the authentication credentials are valid and completes authentication 230 by sending content to be displayed in the browser object 106 indicating that the user is authenticated allowing the user 102 to confirm and complete the transaction. In some embodiments, an authentication cookie 210 may also be sent to the browser object 106 as part of completing authentication 230. The browser object 106 may store or update the authentication cookie 210 in the data store 204 associated with the browser object. In some embodiments, the authentication cookie 210 may also be stored or updated elsewhere on the mobile device 100, such as within the payment application 206, or a mobile device data store 214 used by the operating system of the mobile device 100. In some embodiments, the payment hosting server may repeat similar steps for each failed authentication, and the payment hosting server 110 may be configured to limit the number of repetitions for failed authentications before disabling an account.

In further embodiments, the payment application 206 or browser object 106 may periodically check whether stored authentication cookie 210 or the authentication token 212 is up to date. For example, browser object 106 may communicate with payment application 206 to identify if authentication cookie 210 corresponds to authentication information stored in association with payment application 206, and if the information is incorrect, may request to receive updated information so that an update of authentication cookie 210 can be performed. In even further embodiments, payment application 206 may maintain a mapping of browser objects that have stored authentication cookies (that correspond to the payment application), and based on the mapping, if authentication information stored in association with payment application 206 is updated, payment application 206 may transmit the updated authentication information to corresponding browser objects to cause an update of authentication session tokens stored in association with the browser objects.

For example, a user 102 of the mobile device 100 may open a shopping mobile application 104. The user may select a link indicating a desire to checkout and pay for a purchase. During the checkout process, the user may be prompted to select a payment method, such as PayPal® and the mobile application 104 will then contact the payment hosting server 110. Based on the payment method selected, the mobile application 104 may launch a browser object 106 and send a payment request 222 to the payment hosting server 110. This request may be a request for a particular web page, interfacing with a particular web service, or other application interface configured to accept payments on the payment hosting server 110. The payment request 222 is received by the dynamic session engine 114, which may then send a detection request 224 back to the browser object 106. The detection request 224 may be in the form of a web page, web service response, or other application interface response that causes the browser object 106 to perform payment application detection 202. Payment application detection 202 executes logic operations, taking parameters of the detection request 224 into account when interfacing with an API provided by the mobile OS. For example, in the Android operating system provides a function within the PackageManager class, getPackageInfo( ) that can be called by the browser object 106 which will cause the mobile device operating system to return information that can be used to determine whether the payment application 206 is installed on the mobile device 100. The payment application detection 202 logic may find a authentication cookie 210 associated with the payment hosting server 110. The authentication cookie 210 may be transmitted to the dynamic session engine 114 as part of the detection results 226 allowing the payment hosting server to perform authentication 230 indicating the user is authenticated and identifying the associated user account. The dynamic session engine 114 may construct a customized user interface 228 containing content indicating the user 102 is authenticated with the payment hosting server 110. The customized user interface 228 may be transmitted back to the browser object 106 and displayed to the user 102. The user 102 may then provide input confirming the transaction. The browser object may then send a payment completion request 232 to the payment hosting server 110 to complete the transaction. The payment hosting server may process the transaction and send a payment completion response 234 to the browser object 106 to display the results of the transaction to the user.

Figure 3:
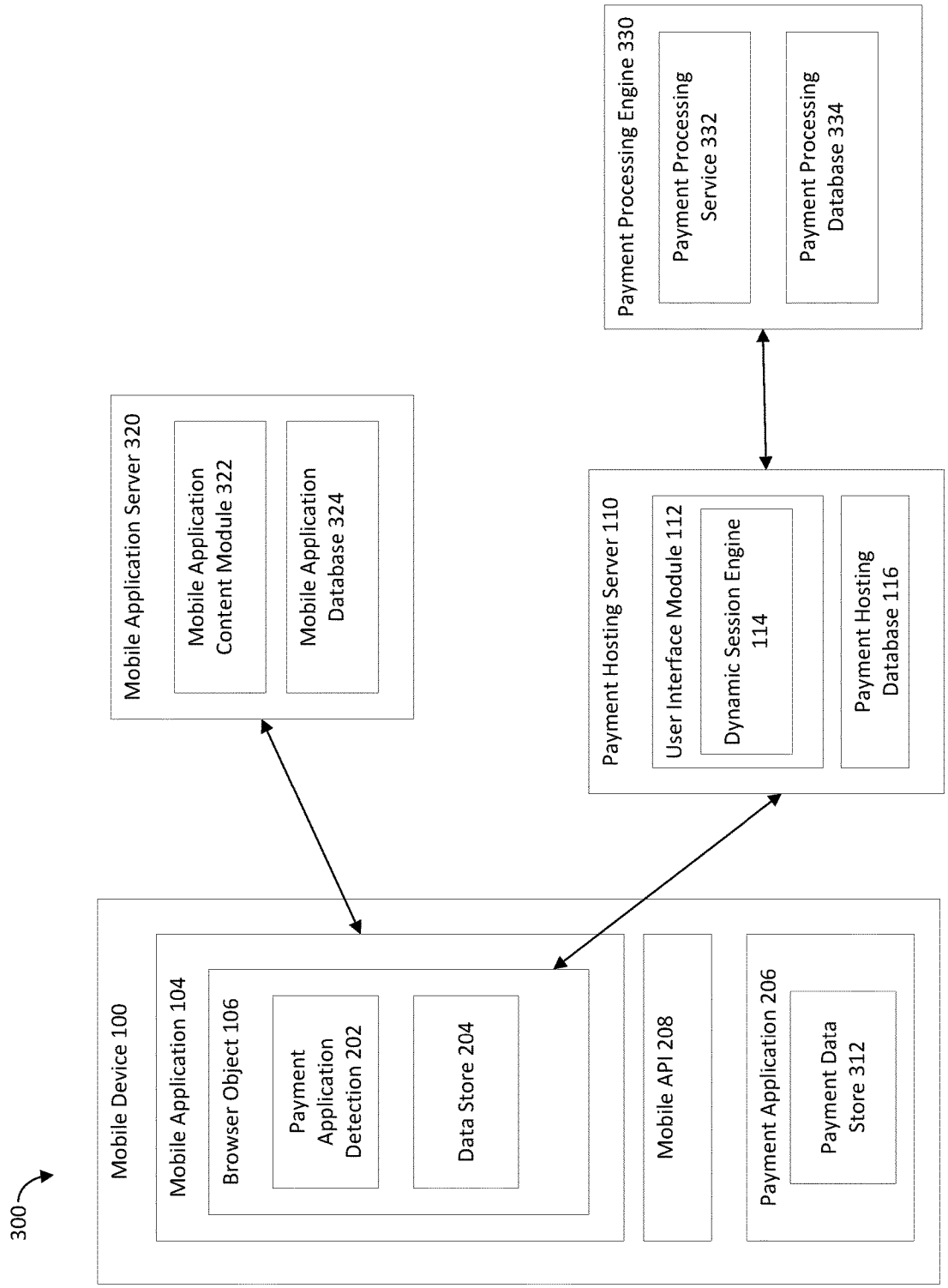
FIG. 3 is a block diagram showing the systems that interact with the mobile application according to an embodiment of the present disclosure.

FIG. 3 illustrates block diagram of a system view 300 for a mobile application 104 configured use a browser object 106 to display a customized user interface 228, according to some embodiments of the disclosure. In some embodiments, the mobile device 100 contains a mobile application 104, such as a shopping application. The mobile application 104 may interface with the mobile application server 320 to provide content for a user, as described below. This content may allow a user to purchase items and services. The mobile application 104 may contain links or other interface elements that create a browser object 106 capable of interacting as a web browser to access web content, web services, or other application interfaces. The browser object may communicate with servers such as the payment hosting server 110 to display interfaces for performing certain tasks, such as completing a payment transaction. The browser object 106 may perform payment application detection 202 as described in FIG. 2 above to detect whether a payment application 206 is present on the mobile device 100. The payment application detection 202 may be executed from code within the mobile application 104 or browser object 106, or it may be code embedded within the content provided by the payment hosting server 110, such as JavaScript. The payment application detection 202 may detect whether an authentication cookie 210 is present in a data store 204 associated with the browser object 106. The payment application detection 202 may also detect whether an authentication token 212 is present within the payment application 206 including a payment data store 312 within the payment application 206. The browser object 106 may detect the presence of the payment application 206 and retrieve an authentication cookie 210 using features provided by the mobile API 208.

For example, the mobile application 104 may be a shopping application associated with a merchant such as Amazon, Walmart, Best Buy, or other retailer. The mobile application 104 may interact with a mobile application server 320 to provide content and interface for users to add items to a cart for purchase. Upon selecting a link within the mobile application 104 to check out, the mobile application may open a browser object 106 to complete the payment. The browser object 106 may contact payment hosting servers 110 provided by payment processors such as PayPal to complete the payment transaction. Thus, while the mobile application 104 is interacting with the mobile application server 320 to provide content related to item selection and user identification with the mobile application server 320, the browser object 106 can provide an interface and respond to requests from the payment hosting server 110 to complete the payment transaction. The mobile application 104 may provide information to the browser object 106 to help facilitate the payment transaction, such as user identification, transaction amount, and contact information of the user associated with the mobile application server. The payment hosting servers 110 will request information from the browser object, as described in FIG. 2, to provide a customized user interface for completing the payment transaction. The user may then provide the appropriate input, such as by confirming the account and transaction amount, such that the payment hosting server 110 may complete the payment transaction.

The mobile application server 320 may provide content to be used by the mobile application 104. This may include information for items or services that can be purchased by the user 102 or a shopping cart to track items selected for purchase. The content may be provided by a mobile application content module 322 that may provide content through a web server, web service, or other application server. The mobile application server 320 may also use a mobile application database to store data related to items and services available for purchases, as well as information regarding the user 102.

For example, a mobile application 104 may provide an interface for a user to select items for purchase. The mobile application 104 may communicate with a mobile application server 320 to display content regarding items available for purchase. The mobile application server 320 may use a mobile application content module 322 to manage content sent to the mobile application 104 for display. The mobile application database 324 may be used by the mobile application server 320 to track items in a user's shopping cart, user preferences, and stored user information such as contact information, payment information, or user preferences.

The payment hosting server 110 may contain a user interface module 112 for generating user interface content to mobile applications 104 that requests payment transactions. A mobile application 104 may open a browser object 106 for communication with the payment hosting server 110. The browser object 106 may request an interface for completing a payment from the payment hosting server 110. The payment hosting server 110 may send the request to a user interface module 112 which will use the dynamic session engine 114 to communicate with the browser object as described in FIG. 2 to determine the proper user interface to send to the browser object 106. The user interface module 112 may use a payment hosting database 116 to authenticate the user, maintain authenticated session information, and to provide customizations to content provided to the browser object 106 based on user preferences. Once the browser object 106 has all the information needed to complete a transaction, the payment hosting server 110 can use the information to process the transaction. This may involve sending the transaction to a payment processing engine 330 to perform the steps needed to complete transaction processing, as described below.

For example, a payment hosting server 110 may receive a request from a browser object 106 to complete a payment transaction. The user interface module 112 may use the dynamic session engine 114 to send a request to the browser object 106 to perform payment application detection, as described in FIG. 2 above. The user interface module 112 may use an authentication cookie 210 sent by the browser object 106 as well as information in the payment hosting database 116 to generate a customized user interface to the browser object 106 for display. When the user 102 provides input to the browser object 106 to confirm the transaction, the payment hosting server 110 may use the transaction information, such as an account identifier, the payment method used, and any payment information or contact details stored in the payment hosting database 116 to contact the payment processing engine 330 for processing. The payment hosting server 110 may then take the results provided by the payment processing engine 330 using the payment processing service 332 and send content based on the transaction processing results, such as a successful payment confirmation, to the browser object 106 for display.

The payment processing engine 330 may provide a payment processing service 332 that can be used by other devices to process payment transactions. The payment processing service 332 may provide an interface, such as a web service or other application interface so that other devices and systems may send transactions to the payment processing engine 330 to complete transaction processing. Transaction processing may include contacting banks, card issuers, and other payment services to request processing of a requested transaction. In some embodiments, transaction processing may include deducting from a balance maintained by the payment processor, or adding to a credit balance owed by a user. The payment processing engine 330 will send the results of the payment processing to the requesting device, such as the payment hosting server 110.

For example, the payment processing engine 330 may receive a transaction request from the payment hosting server 110 to process a transaction requested by the browser object 106. The request may contain information such as a request to use a credit card. The payment processing engine 330 may use the payment processing database to update the credit balance to reflect the transaction amount. The payment processing engine 330 may respond to the payment hosting server 110 by providing a response indicating the payment has been processed successfully.

Figure 4:
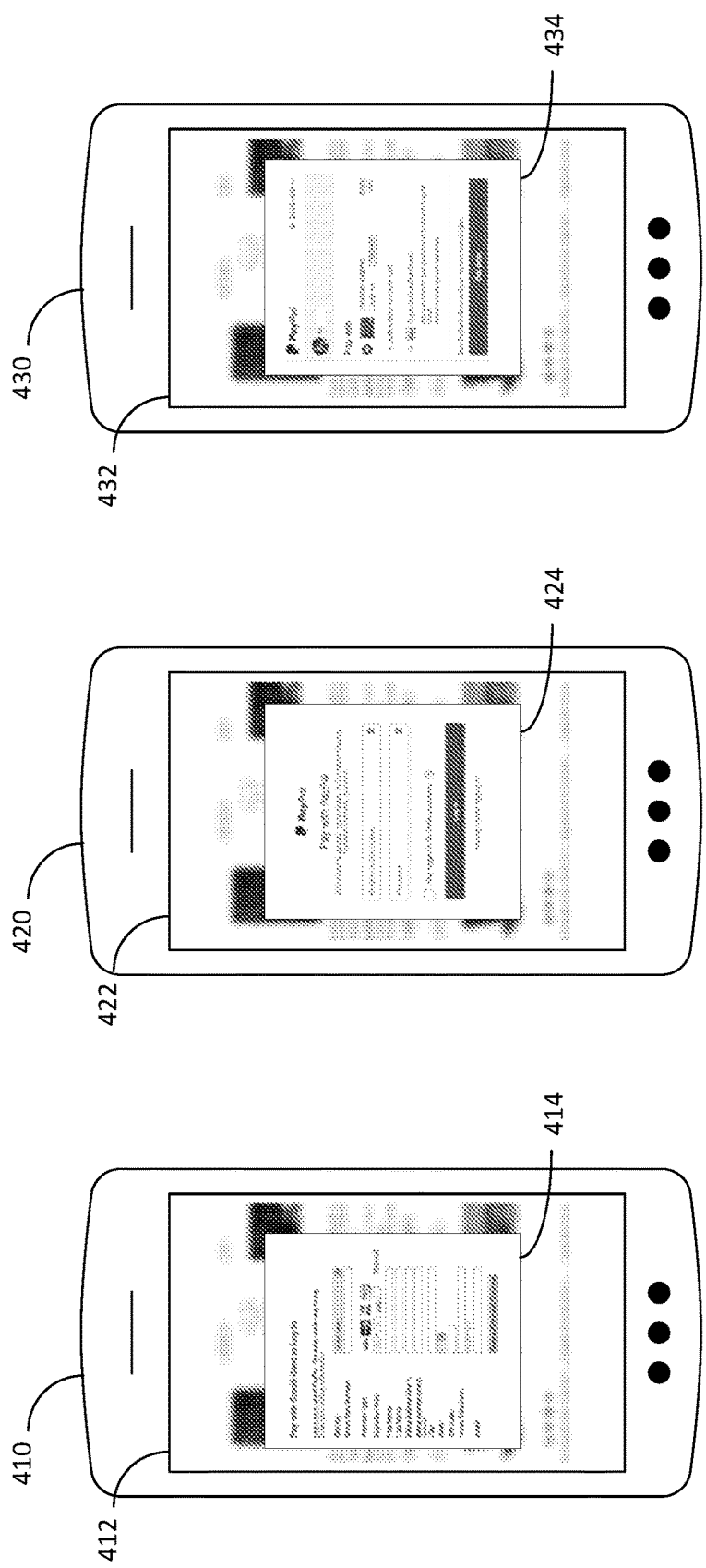
FIG. 4 is an illustration showing mobile devices with different dynamically generated content in a browser object, according to various embodiments of the present disclosure.

FIG. 4 illustrates examples of the content in the customized user interface 228, according to some embodiments of the disclosure. Mobile device 410 illustrates a mobile application 412 with a browser object 106 that is configured to display an exemplary interface for entering information for a one-time payment 414. This may include credit card information, banking information for ACH transfers (e.g., routing and account numbers), or other information needed to complete a one-time payment. Mobile device 420 illustrates a mobile application 422 with a browser object 106 that is configured to display an exemplary interface with content 424 for authenticating with the payment hosting server 110. This may include an interface for entering a username, password, or biometric authentication information. Mobile device 430 illustrates a mobile application 432 with a browser object 106 that is configured to display an exemplary interface indicating a user is already authenticated 434 with the payment hosting server 110 and an interface for confirming payment.

Figure 5:
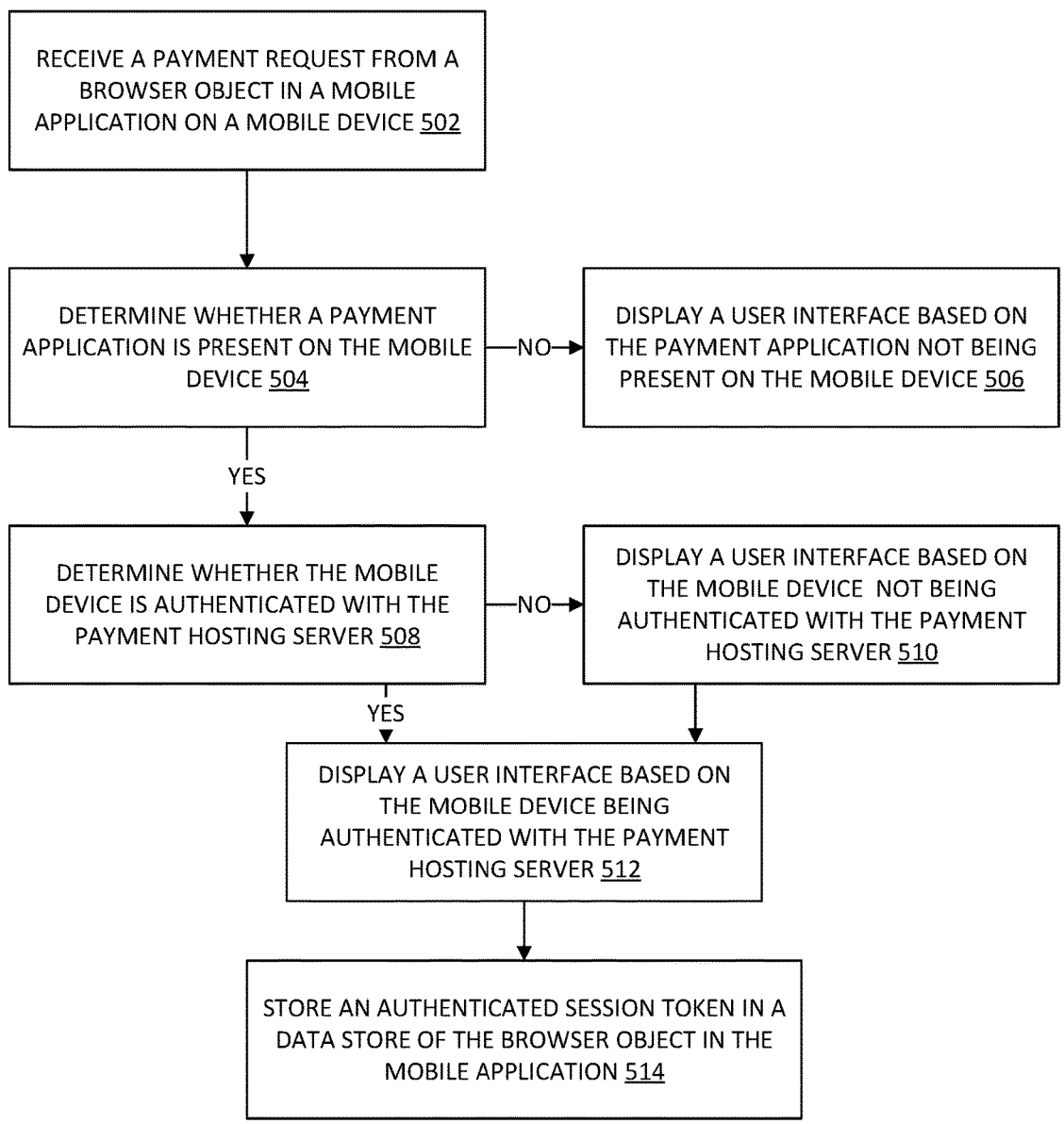
FIG. 5 is a flowchart showing a process of a displaying a customized user interface using a dynamic session engine according to an embodiment of the present disclosure.

FIG. 5 illustrates an exemplary process 500 for generating dynamic session interfaces, according to some embodiments of the disclosure. In some embodiments, the dynamic session engine 114 receives a payment request 222 from a browser object 106. The dynamic session engine 114 may determine whether a payment application 206 is present on the mobile device 100 and whether the mobile device 100 is authenticated with payment hosting server 110. Depending on whether the payment application 206 is present and whether the mobile device 100 is authenticated with the payment hosting server 110, a customized user interfaces 228 is displayed. In some embodiments, an authentication cookie is stored in a data store 204 associated with the browser object 106.

At step 502, the payment hosting server 110 receives a payment request 222 from the browser object 106. This payment request 222 may be a request for a particular web page, interfacing with a particular web service, or other application interface configured to accept payments. The payment request 222 may contain information including the payment service desired, transaction amount, and an identifier indicating the mobile application sending the payment request 222. For example, a user 102 of the mobile device 100 may open a shopping mobile application 104, such as a Walmart application. The user 102 may add one or more items for purchase and select a link indicating the user 102 wants to check out using PayPal. The mobile application 104 opens a browser object 106 and sends a payment request 222 to the payment hosting server 110, which may be a URL provided by the payment hosting server for merchants to use during their checkout process. The request may contain additional information such as the transaction amount, method of payment, and an identifier indicating Walmart as the application requesting the payment. The request may be formatted according to the protocol expected by the payment hosting server 110. For example, if the payment hosting server 110 is expecting a web request, the payment request 222 may be formatted as an HTTPS POST request.

At step 504, the dynamic session engine 114 determines whether a payment application 206 is present on the mobile device 100. The dynamic session engine 114 sends a detection request 224 with instructions for the browser object 106 to determine whether the payment application 206 is present. For example, the user selects a payment method, such as PayPal or other payment hosting server. The browser object 106 receives the detection request 224 and executes instructions to determine whether the appropriate payment application 206, such as the PayPal mobile application, is present on the mobile device 100. The instructions may be part of the code of the mobile application 104, or they may be sent as part of the detection request 224 in code interpreted by the browser object 106, such as JavaScript. These instructions may use the mobile API 208 provided by the operating system of the mobile device 100. The browser object 106 may send results provided by the mobile API 208 as the detection results 226 to the dynamic session engine 114. For example, the browser object 106 may receive a detection request 224 from the payment hosting server 110 as described in FIG. 2, above with logic that will determine whether the payment application is installed on the mobile device. In some embodiments, the browser object 106 may execute code to communicate with the mobile operating system of the mobile device 100. The browser object 106 may receive a response from the operating system of the mobile device 106 as to whether the payment application 206 is installed on the mobile device 100. In some embodiments, the browser may execute code to interface with the Android API to determine whether the payment application is installed, such by calling the getPackageInfo( )method within the Android development toolkit, which causes the mobile OS to return information used to determine whether an application is installed on the mobile device. Similarly in iOS development toolkit the check whether the payment application is installed can be done by means of deep linking scheme URL Continuing step 504, if the payment application 206 is not present on the mobile device, the result may be sent to the payment hosting server 110 and may continue at step 506. If the payment application 206 is present on the mobile device 100, the browser object 106 will then determine whether the mobile device 100 is authenticated with the payment hosting server 110 may continue at step 508.

At step 506, the dynamic session engine 114 may receive detection results 226 indicating that the payment application 206 is not present on the mobile device 100. The dynamic session engine 114 may create a customized user interface 228 with content 314 to allow the user to make a one-time payment using the payment hosting server 110. For example, a user has selected to pay with PayPal or other payment services provider during the checkout process of a mobile application 104. The dynamic session engine 114 of the payment hosting server 110 may receive a detection result 226 indicating that the payment application 206 associated with the payment hosting server 110 is not present on the mobile device 100. The dynamic session engine 114 may create a customized user interface 228 with content 314 to allow the user to make a one-time payment through the payment hosting server 110. The customized user interface 228 is sent to the browser object 106 for display to the user. The user may then interact with the customized user interface 228 to complete the payment process. In some embodiments, a payment completion request 232 may be sent containing the information needed to complete the payment. For example, the customized user interface 228 may ask for a user's credit card number, expiration date, and security code, as well as the user's billing information, such as full name, address, and phone number. Data entered by the user may be sent to the payment hosting server 110 in the payment completion request 232. The payment completion request 232 may be a HTTP request, web services request, or other application interface. The payment hosting server 110 may complete the transaction, which may include sending a payment completion response 234 to the mobile device, which may be displayed to the user in the browser object 106. The payment hosting server 110 may send the transaction information to a payment processing engine 330 to complete payment processing. Transaction processing may include contacting banks, card issuers, and other payment services to request processing of a requested transaction. In some embodiments, transaction processing may include deducting from a balance maintained by the payment processor, or adding to a credit balance owed by a user. The payment processing engine 330 may send the results of the payment processing to the payment hosting server 110. The payment hosting server may send the payment completion response 234 to the browser object for display to the user.

In an alternative embodiment, the customized user interface 228 may include content allowing the user to create an account on the payment hosting server 110 in addition to or in place of the content 314 allowing the user to make a one-time payment through the payment hosting server.

At step 508, if the payment application 206 is present on the mobile device, the dynamic session engine 114 may determine whether the mobile device 100 is authenticated with the payment hosting server 110. A mobile device 100 may be considered authenticated with the payment hosting server if either an authenticated session cookie is found in the data store 204 or if the payment application 206 is authenticated with the payment hosting server 110. Continuing from step 504, the browser object 106 may execute logic to determine whether an authentication cookie 210 is present within the data store 204 associated with the browser object 106 indicating that the user has previously authenticated with the payment hosting server 110 or determine whether the payment application 206 is authenticated with the payment hosting server 110. If either method indicates the mobile device 100 is authenticated with the payment hosting server 110, the detection results 226 is sent to the dynamic session engine with information needed to authenticate the session to complete the payment transaction. In some embodiments, an authentication token 212 is retrieved from the payment application 206 and sent as part of the detection results 226 for authentication. In some embodiments, the process may proceed to step 512. If neither method indicates the mobile device 100 is authenticated with the payment hosting server 110, then the browser object 106 sends detection results 226 to the payment hosting server 110 indicating that the mobile device 100 is not authenticated with the payment hosting server 110. In some embodiments, the process may proceed to step 510. A detailed explanation of the process for the determination of whether the mobile device is authenticated with the payment hosting server 110 is described in FIG. 6 below.

At step 510, the dynamic session engine 114 may receive detection results 226 indicating that the payment application 206 is present on the mobile device 100 but that the mobile device is not authenticated with the payment hosting server. The dynamic session engine 114 may create a customized user interface 228 with content 424 to allow the user to provide authentication credentials needed for the mobile device to authenticate 230 with the payment hosting server 110. This may include a request for the user to provide a username and password, or biometric identification such as a fingerprint, retinal scan, or other biometric authentication information. The user may then interact with the customized user interface 228 and authentication information to authenticate 230 with the payment hosting server 110. The browser object 106 may send the authentication information to the payment hosting server 110. The payment hosting server 110 will authenticate 230 the user 102 based on the authentication information. Once the session is authenticated, the process proceeds to step 512. Continuing the example from step 508, the dynamic session engine 114 of the payment hosting server 110 may receive a detection result 226 indicating that the payment application 206 is present on the mobile device 100 but that the mobile device is not authenticated with the payment hosting server. The dynamic session engine 114 may create a customized user interface 228 with content 424 to allow the user to log into the payment hosting server 110. The customized user interface 228 is sent to the browser object 106 for display to the user. and complete the payment process. The user then enters a username and password to authenticate 230 with the payment hosting server 110. The browser object 106 sends the authentication information to the payment hosting server 110. Upon receiving authentication credentials to authenticate, the payment hosting server 110.

At step 512, the dynamic session engine 114 may determine that the payment application 206 is present on the mobile device 100 and that the mobile device 100 is authenticated with the payment hosting server 110. The dynamic session engine 114 may receive the authenticated session key 210 as part of the detection results 226. The payment hosting server 110 may use the authentication cookie 210 to authenticate 230 the session and associate the transaction with a user profile in the payment hosting database 116. The dynamic session engine 114 may create a customized user interface 228 with content indicating the user is authenticated, details of the transaction, such as amount and payment method, and prompt the user to confirm the transaction. The customized user interface 228 may be transmitted to the browser object 106 for display to the user.

In some embodiments, the payment hosting server 110 receives authentication information retrieved from the payment application 206 of the mobile device or from user input provided in step 510. The payment hosting server will authenticate the session based on the authentication information and associate the transaction with a user profile in the payment hosting database 116. The dynamic session engine 114 may create a customized user interface 228 with content indicating the user is authenticated, details of the transaction, such as amount and payment method, and prompt the user to confirm the transaction. The customized user interface 228 may be transmitted to the browser object 106 for display to the user.

For example, the dynamic session engine 114 of the payment hosting server 110 may receive a detection result 226 indicating that the payment application 206 is present on the mobile device 100 and that the mobile device is authenticated with the payment hosting server 110 by determining that the data store 204 contains an authentication cookie. The browser object may include the authentication cookie in the detection result 226. The dynamic session engine 114 may create a customized user interface 228 with content 334 showing the user is authenticated, the method of payment, the transaction amount, and prompt the user to confirm and complete the transaction. The customized user interface 228 is sent to the browser object 106 for display to the user. The user may then interact with the customized user interface 228 to complete the payment transaction.

At step 514, the browser object 106 may store an authentication cookie to indicate that the browser object 106 is authenticated with the payment hosting server 110. The browser object 106 may authenticate with the payment hosting server using authentication credentials either when prompted from the user in step 510, described above, or when authentication credentials are retrieved from the payment application 206 in step 512, described above. When the browser object 106 authenticates with the payment hosting server 110, the payment hosting server may send an authentication cookie to the browser object 106. The browser object 106 may then save the authentication cookie in a data store 204. For example, the detection results 226 indicate a user has the payment application 206 installed but has not authenticated with the user. A customized user interface 228 is displayed to the user containing the content 424 prompting the user to log in. The user provides authentication credentials which is sent by the browser object 106 to the payment hosting server 110. The payment hosting server 110 authenticates the session and sends an authentication cookie back to the browser object 106. The browser object can then store the authentication cookie in the data store 204.

Figure 6:
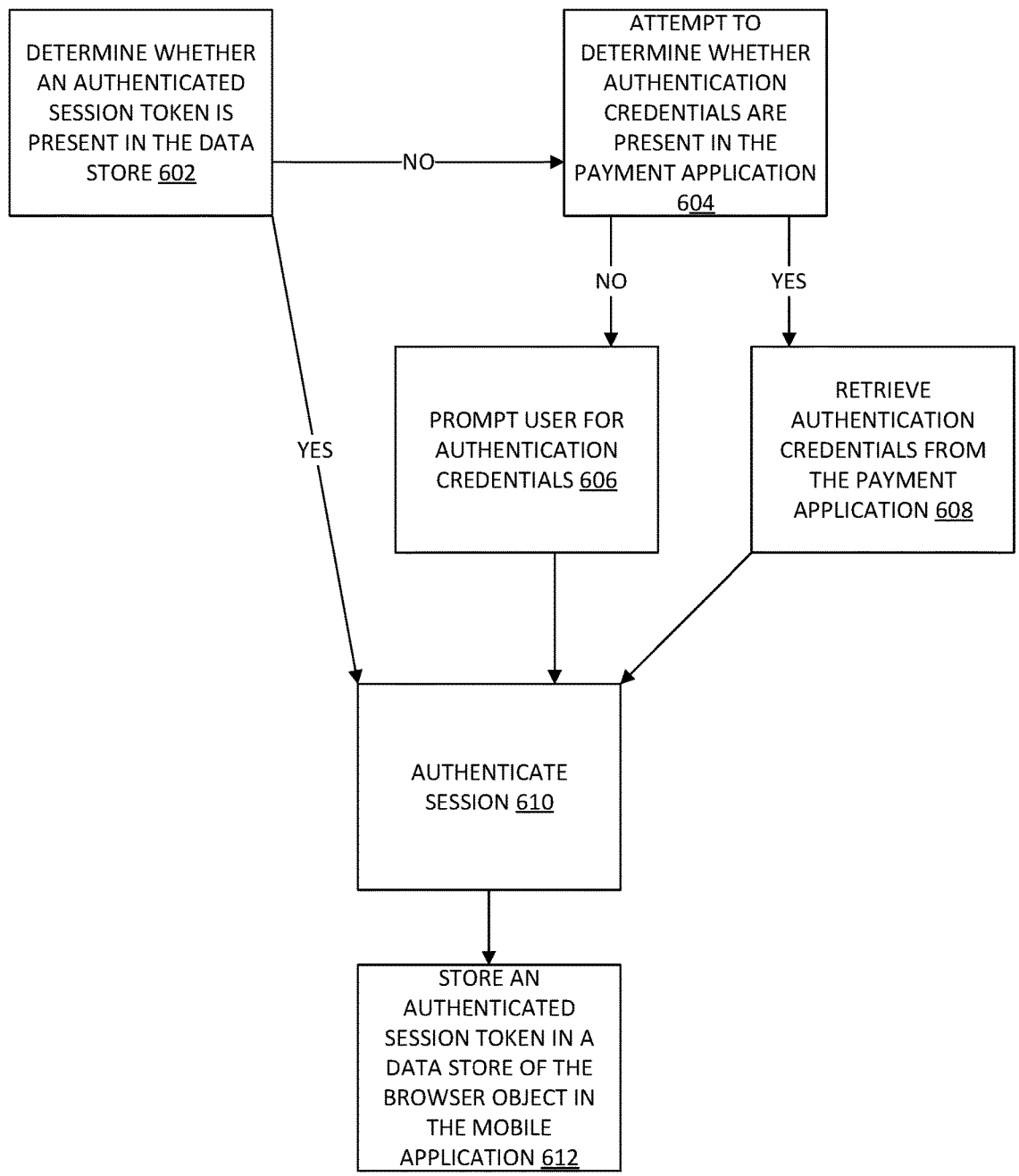
FIG. 6 is a flowchart showing a process of authenticating with the payment hosting server according to an embodiment of the present disclosure.

FIG. 6 illustrates an exemplary process 600 for determining whether the mobile device 100 is authenticated with the payment hosting server 110. Three methods are used to authenticate the mobile device 100 with the payment hosting server 110: 1) An authentication cookie is present in the data store 204 associated with the browser object 106 indicating the mobile device 100 has previously authenticated with the payment hosting server 110, 2) Authentication credentials for the payment application 206 can be retrieved from the mobile device 100, or 3) The user 102 provides authentication credentials when prompted by the user interface displayed in the browser object 106. These methods are used sequentially as described in the steps below.

At step 602, in some embodiments, the browser object 106 may execute logic to determine whether an authentication cookie 210 (e.g., a cookie) is present within the data store 204 associated with the browser object 106 indicating that the user has previously authenticated with the payment hosting server 110. If an authentication cookie 210 is present in the data store 204, the browser object 106 may then retrieve and send the authentication cookie 210 to the dynamic session engine 114 as part of the detection results 226. The dynamic session engine 114 may then generate a customized user interface 228 with content indicating the user has authenticated with the payment hosting server 110 and prompting the user for input to confirm the transaction. For example, the browser object 106 may use CookieManager available as part of the Android API to access cookies in webview to determine that a session cookie exists indicating the user 102 has previously authenticated with the payment hosting server 110. The browser object 106 may then use CookieManager to retrieve the cookie and transmit the cookie information as part of the detection results 226. After transmitting the cookie information as part of the detection results 226, in some embodiments, the process may proceed to step 610. If no authentication cookie 210 is present in the data store 204, in some embodiments, the process may proceed to step 604.

At step 604, in some embodiments, an authentication cookie 210 is not present in the data store 204 associated with the browser object 106. The browser object 106 may determine whether payment application 206 is authenticated with the payment hosting server 110. The browser object 106 may use functionality provided by a mobile operating system API, such as the Android operating system shared preferences capability or the mobile device data store 214 to retrieve authentication information associated with the payment application 206. The browser object 106 may send the retrieved authentication information to the dynamic session engine 114 as part of the detection result 226. For example, the browser object 106 may use CookieManager available as part of the Android API to access cookies in webview to determine that no cookie exists in the data store 204. The browser object 106 may then access the mobile device data store 214 to determine whether authentication information associated with the payment application is present in the payment application 206, which may include the mobile device data store 214. If authentication information for the payment application 206 is present on the mobile device, in some embodiments, the process may proceed to step 608. If the authentication information is not present on the mobile device, in some embodiments, the process may proceed to step 606.

At step 606, in some embodiments, an authentication cookie 210 is not present in the data store 204 associated with the browser object 106 and the payment application 206 is not authenticated with the payment hosting server 110. The browser object 106 may send a detection result 226 indicating that the payment application 206 is present on the mobile device 100, but that the mobile device 100 is not authenticated with the payment hosting server 110. The dynamic session engine 114 may receive the detection result 226 and generate a customized user interface 228 prompting the user for authentication credentials. The customized user interface 228 is then sent to the browser object 106 for display. The user 102 may then provide authentication credentials which are then sent to the payment hosting server 110 to authenticate 230 the session. For example, the browser object 106 determines no authentication cookie 210 is present in the data store 204 and no authentication information for the payment application 206 exists in the mobile device data store 214. The browser object 106 may transmit a detection result 226 indicating the results to the dynamic session engine 114. After transmitting the detection results 226, the browser object 106 may receive a customized user interface 228 from the dynamic session engine 114 and displays an interface to the user prompting for authentication credentials. User input for authentication credentials may be sent to the payment hosting server 110. In some embodiments, the process may proceed to step 610.

At step 608, in some embodiments, an authentication cookie 210 is not present in the data store 204 associated with the browser object 106 but the payment application 206 is authenticated with the payment hosting server 110. The browser object 106 may retrieve the authentication credentials from the payment application 206 through shared preferences or from the mobile device data store 214. The browser object 106 may transmit the authentication credentials to the payment hosting server 110. For example, the browser object 106 determines no authentication cookie 210 is present in the data store 204 but the presence of authentication information for the payment application 206 exists in the mobile device data store 214. User input for authentication credentials may be sent to the payment hosting server 110 as part of the detection results 226. In some embodiments, the process may proceed to step 610.

At step 610, the payment hosting server 110 authenticates the session. The payment hosting server 110 has received either an authentication cookie 210 or authentication credentials. The payment hosting server 110 validates the authentication cookie 210 or the authentication credentials. The payment hosting server 110 can validate the authentication information in the payment hosting database 116. Once the session has been validated, the payment hosting server may transmit an authentication cookie 210 to the browser object 106 to store in the data store 204. For example, the user has provided authentication credentials prompted by the customized user interface 228 to the browser object 106 at step 606. The browser object 106 transmits the authentication credentials to the payment hosting server 110. The payment hosting server 110 authenticates the authentication credentials with values in the payment hosting database 116 and authenticates the session. The payment hosting server 110 creates an authentication cookie 210 and transmits the authentication cookie 210 to the browser object 106.

At step 612, the browser object 106 receives an authentication cookie 210 from the payment hosting server 110. The browser object then stores the authentication cookie in a data store 204 associated with the browser object 106. For example, the browser object 106 receive a cookie from the payment hosting server 110. The browser object 106 may use CookieManager available as part of the Android API to store the cookies in a data store 204 associated with the browser object 106.

Figure 7:
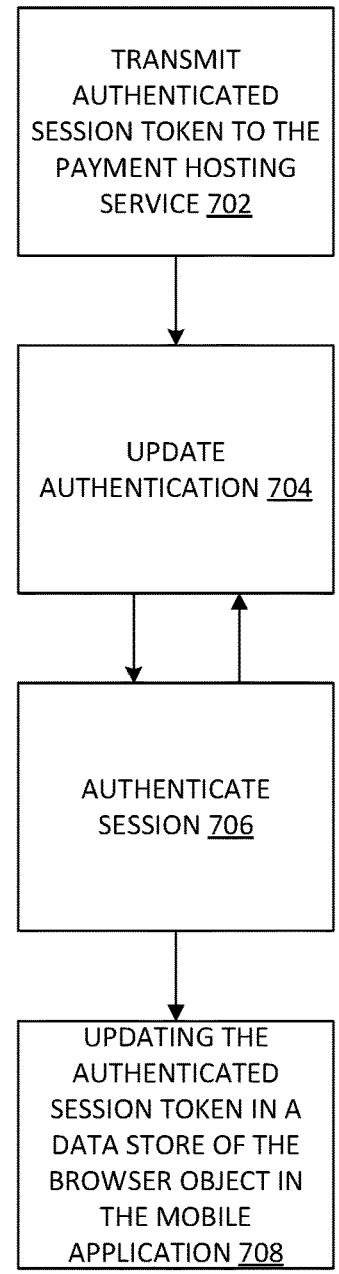
FIG. 7 is a flowchart showing a process for updating an authentication cookie according to an embodiment of the present disclosure.

FIG. 7 illustrates an exemplary process 700 for updating the authentication cookie 210. An authentication cookie may need to be updated if sufficient time has passed to cause the token to expire, or if the authentication credentials have changed since the authentication cookie was created. When an invalid or expired token is used to authenticate the browser object 106 with the payment hosting server 110, the payment hosting server 110 may update the token.

In some embodiments, at step 702, the browser object 106 receives a detection request 224 as described in FIG. 2 above. The browser object 106 then executes logic to perform payment application detection 202. The browser object 106 determines that an authentication cookie 210 is present in the data store 204. The browser object 106 then executes logic to retrieve the authentication cookie 210 from the data store and transmit the authentication cookie 210 to the payment hosting server 110. The payment hosting server 110 attempts to authenticate 230 the session using the authentication cookie 210 and determines that the token is invalid or expired. For example, the browser object 106 may receive a detection request to determine whether the mobile device is authenticated with the payment hosting server 110. The browser object 106 uses CookieManager available as part of the Android API to access cookies and to determines that an authentication cookie 210 exists in the data store 204. The browser object 106 executes logic to retrieve the authentication cookie 210 and transmits the authentication cookie 210 to the payment hosting server 110. The payment hosting server 110 determines that the cookie is no longer valid.

In some embodiments, at step 704, the dynamic session engine 114 builds a customized user interface 228 with content prompting the user 102 to provide updated authentication credentials. The customized user interface 228 may be transmitted to the browser object 106 for display to the user 102. The user may enter updated authentication credentials into the customized user interface 228. The updated authentication credentials may be transmitted by the browser object 106 to the payment hosting server 110. For example, the dynamic session engine 114 creates customized user interface 228 to prompt the user 102 to provide updated authenticated credentials to the payment hosting server 110. The customized user interface 228 is transmitted to the browser object 106 for display to the user 102. The user provides updated authentication credentials to the customized user interface 228 by entering an updated username and password. The browser object 106 then transmits the updated username and password to the payment hosting server 110.

In some embodiments, at step 706, the payment hosting server 110 verifies the updated authentication credentials to authenticate the session. The payment hosting server 110 may verify the updated authentication credentials against expected values in the payment hosting database 116. If the updated authentication credentials are unable to be verified, step 704 may be repeated to prompt the user to provide valid authentication credentials. Once the updated authentication credentials are verified, the session may be authenticated. For example, the payment hosting server 110 verifies the updated username and password with expected values in the payment hosting database 116. If the updated username and password do not match the expected values, the payment hosting server will again use the dynamic session engine 114 creates customized user interface 228 to prompt the user 102 to provide updated authenticated credentials. If the username and password are verified, the payment hosting server may authenticate the session.

In some embodiments, at step 708, the payment hosting server 110 successfully authenticates the session and creates an updated authentication cookie 210. The payment hosting server 110 may transmit the authentication cookie 210 to the browser object 106. The browser object 106 may store the authentication cookie 210 in a data store 204 associated with the browser object. For example, the payment hosting server 110 successfully authenticates the session. The payment hosting server 110 then creates an updated session cookie. The payment hosting server 110 may transmit the session cookie to the browser object 106. The browser object 106 may store the authentication cookie 210 into a data store 204 associated with the browser object 106.

Figure 8:
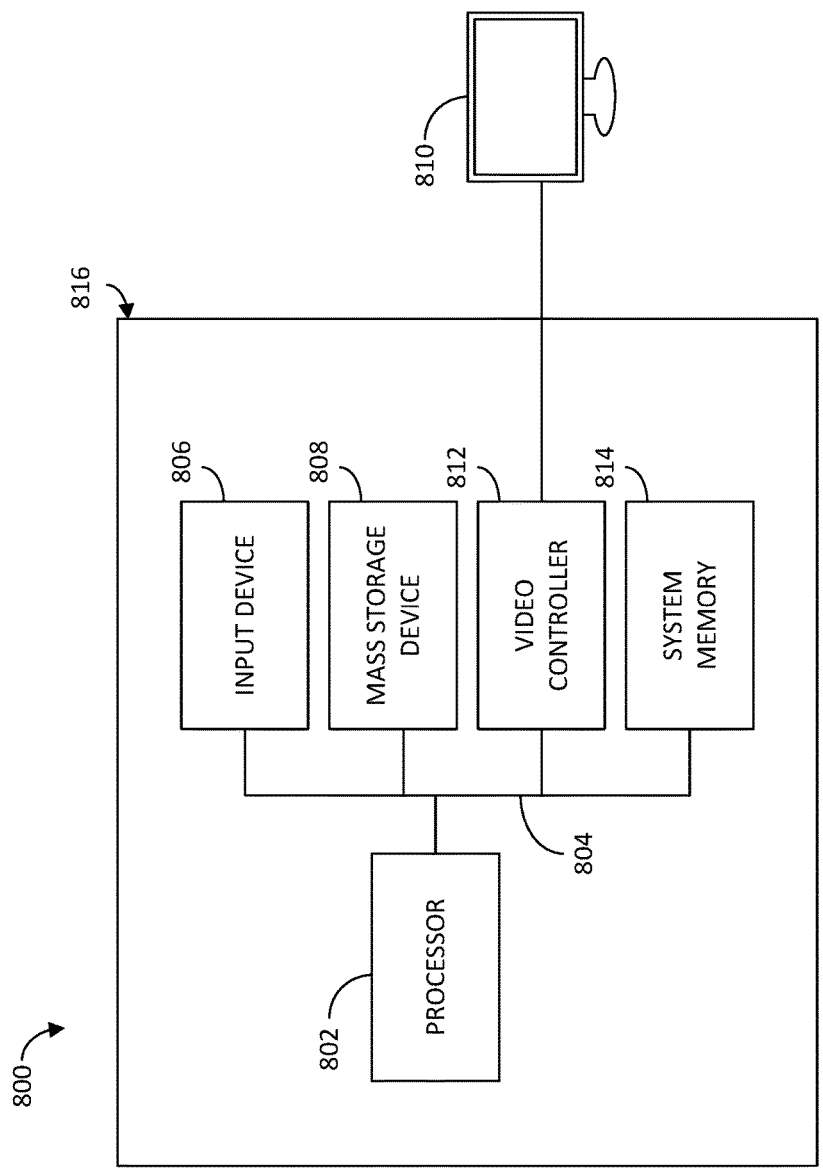
FIG. 8 is a block diagram of a system for implementing a device according to an embodiment of the present disclosure.

FIG. 8 is a block diagram of a computer system 800 suitable for implementing one or more embodiments of the present disclosure, including the mobile device 100, the payment hosting server 110, mobile application server 320, and payment processing engine 330. In various implementations, the mobile device 100 may include a mobile cellular phone or tablet, and the payment hosting server 110, mobile application server 320, and payment processing engine 330 may include a network computing device, such as a server. Thus, it should be appreciated that the devices 100, 110, 320, and 330 may be implemented as the computer system 800 in a manner as follows.

The computer system 800 includes a processor 802, which is connected to a bus 804. Bus 804 serves as a connection between processor 802 and other components of computer system 800. An input device 806 is coupled to processor 802 to provide input to processor 802. Examples of input devices may include keyboards, touchscreens, pointing devices such as mouses, trackballs, and trackpads, and/or a variety of other input devices known in the art. Programs and data are stored on a mass storage device 808, which is coupled to processor 802. Examples of mass storage devices may include hard discs, optical disks, magneto-optical discs, solid-state storage devices, and/or a variety of other mass storage devices known in the art. computer system 800 further includes a display 810, which is coupled to processor 802 by a video controller 812. A system memory 814 is coupled to processor 802 to provide the processor with fast storage to facilitate execution of computer programs by processor 802. Examples of system memory may include random access memory (RAM) devices such as dynamic RAM (DRAM), synchronous DRAM (SDRAM), solid state memory devices, and/or a variety of other memory devices known in the art. In an embodiment, a chassis 816 houses some or all of the components of computer system 800. It should be understood that other buses and intermediate circuits can be deployed between the components described above and processor 802 to facilitate interconnection between the components and the processor 802.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
   a non-transitory memory; and
   one or more hardware processors coupled with the non-transitory memory and configured to execute instructions from the non-transitory memory to cause the system to perform operations comprising:
   receiving, from a browser object associated with a mobile application of a computing device, a transaction request for processing a transaction during a session associated with the mobile application;
   transmitting, to the mobile application, programming code that causes the computing device to retrieve authentication credentials from a web application running on the computing device, the authentication credentials for authenticating a user of the computing device with a service provider associated with the web application, the web application being different from the mobile application;
   automatically authenticating the user for a session associated with the transaction request based on the authentication credentials;
   processing the transaction for the user based on the authenticating the user; and
   in response to authenticating the user based on the authentication credentials retrieved from the web application, causing the browser object to store an authentication session token in a data store of the browser object associated with the mobile application, the authentication session token usable for authenticating the user by the mobile application in a subsequent interaction with the user.

2. The system of claim 1, wherein the transmitting the programming code is performed in response to determining that the authentication session token is not present in the data store.

3. The system of claim 1, wherein the authentication credentials indicates that the user is authenticated by a hosting server of the web application.

4. The system of claim 1, wherein the authentication credentials are retrieved from the web application using an operating system application programming interface (API).

5. The system of claim 4, wherein the operating system API is a mobile operating system API.

6. The system of claim 4, wherein the operating system API includes a cookie manager usable to access stored authentication session tokens.

7. The system of claim 1, wherein the authenticating the user for the session comprises:
validating the authentication credentials with values in a hosting database; and
transmitting the authentication session token to the browser object for storage.

8. The system of claim 1, wherein the authentication session token is associated with the mobile application.

9. A method comprising:
receiving, from a browser object associated with a mobile application of a computing device, a transaction request for processing a transaction during a session associated with the mobile application;
transmitting, to the mobile application, programming code that causes the computing device to retrieve authentication credentials from a web application running on the computing device;
authenticating a user of the computing device for the session associated with the transaction request based on the authentication credentials, wherein the transaction is processed based on the authenticating the user; and
in response to authenticating the user based on the authentication credentials retrieved from the web application, causing the browser object to store an authentication session token in a data store of the browser object associated with the mobile application, the authentication session token usable for authenticating the user by the mobile application during a subsequent session.

10. The method of claim 9, further comprising:
providing a customized user interface to the browser object for display.

11. The method of claim 9, wherein the authenticating the user comprises:
validating the authentication credentials using data stored on a hosting server.

12. The method of claim 9, wherein the authenticating the user further comprises:
transmitting the authentication session token to the computing device for storage on the browser object.

13. The method of claim 9, wherein the authentication credentials indicates that the user is authenticated by a hosting server of the web application.

14. The method of claim 9, wherein the authentication session token is associated with the mobile application.

15. A non-transitory machine-readable medium having stored thereon machine-readable instructions executable to cause a machine to perform operations comprising:
transmitting, to a mobile application of a computing device, programming code that causes the computing device to retrieve authentication credentials from a web application running on the computing device, the authentication credentials being retrieved for a transaction request received by the mobile application during a session between a user of the computing device and the mobile application;
authenticating the user of the computing device for the session associated with the transaction request based on the authentication credentials; and
in response to authenticating the user based on the authentication credentials retrieved from the web application, (i) processing the transaction and (ii) causing the browser object to store an authentication session token in a data store of the browser object associated with the mobile application, the authentication session token usable for authenticating the user by the mobile application in a subsequent interaction with the user.

16. The non-transitory machine-readable medium of claim 15, wherein the transmitting the programming code is performed in response to determining that the authentication session token is not present in the data store.

17. The non-transitory machine-readable medium of claim 15, wherein the authentication credentials indicates that the user is authenticated by a hosting server of the web application.

18. The non-transitory machine-readable medium of claim 15, wherein the authentication credentials are retrieved from the web application using a mobile operating system application programming interface (API).

19. The non-transitory machine-readable medium of claim 15, wherein the authenticating the user for the session comprises:
validating the authentication credentials with values in a hosting database; and
transmitting the authentication session token to the browser object for storage.

20. The non-transitory machine-readable medium of claim 15, wherein the authentication session token is associated with the mobile application.

* * * * *